United States Patent Office 2,727,072
Patented Dec. 13, 1955

2,727,072

DIASTEREOISOMERIC SUBSTITUTED PROPANES AND PROCESSES FOR THEIR PREPARATION

Robert Michel Jacob, Ablon-sur-Seine, and Jacques Georges Robert, Paris, France, assignors, by mesne assignments, to Parke, Davis & Company, Detroit, Mich., a corporation of Michigan No Drawing. Application April 16, 1951,
Serial No. 221,336

Claims priority, application France July 7, 1950

11 Claims. (Cl. 260—562)

This invention relates to new diastereoisomeric substituted propanes and to processes for their preparation.

By analogy with the nomenclature adopted by Rebstock et al. (J. A. C. S., vol. 71, pp. 2458–2473) in connection with the diastereoisomeric amido diol, 2-dichloracetamido-1-p-nitrophenylpropane 1:3-diol, an optically active isomer of which is known by the common name "chloroamphenicol," structural isomeric forms are herein referred to as "erythro" and "threo" respectively while the racemic mixture and individual optical isomers corresponding to each of these structural isomeric forms are designated DL, L and D respectively.

The substituted propanes of the present invention are the racemic and optically isomeric threo 2-dichloracetamido-1-p-nitrophenyl-1:3-dichloropropanes conforming to the conventional formula:

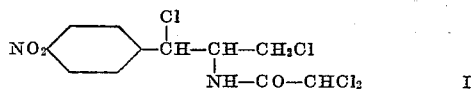

I

According to a preferred feature of this invention, these new tetrachloro compounds are prepared by treating an erythro form of 2-dichloromethyl-4-p-nitrophenylhydroxymethyl-Δ²-oxazoline:

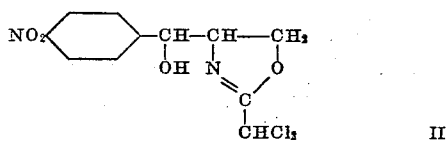

II with thionyl chloride under anhydrous conditions at a sufficiently high temperature to bring about substitution of the α-hydroxy group by a chlorine atom. The process is conveniently effected by heating a mixture of the oxazoline and purified thionyl chloride under reflux until the reaction has been completed.

Other processes which can be employed for the preparation of the compounds of the invention are, however, as follows:

(a) the action of hydrogen chloride under anhydrous conditions at elevated temperature (100° C. is suitable) upon the racemates or optical isomeric forms of threo 2-dichloracetamido-1-p-nitrophenyl-3-chloropropane 1-ol or of threo 2-dichloracetamido-1-p-nitrophenylpropane 1:3-diol or of threo 2-dichloromethyl-4-p-nitrophenylhydroxymethyl-Δ²-oxazoline, the reaction being preferably effected in an inert organic solvent medium such as dioxane;

(b) the action of thionyl chloride under anhydrous conditions with heating under reflux on the racemate or optically isomeric forms of erythro 2-dichloracetamido-1-p-nitrophenyl-3-chloropropane 1-ol.

It will be appreciated that since the starting material used in the aforesaid processes can exist in optically isomeric forms, it is necessary, if a particular optical isomer of the final product is to be obtained either to use the starting material in the form of the corresponding isomer or to resolve the racemate produced in the processes hereinbefore described. For the processes employing an erythro starting material, it is necessary to use either the racemic erythro compound with subsequent resolution, or to use the L-erythro isomer if the intended final product is the D-threo tetrachloro compound as the process involves epimerisation reversing the configuration about the alpha carbon atom. For the processes using, however, a D-threo or L-threo starting material the product has, of course, correspondingly the D-threo or L-threo form, respectively, since in these cases the conversion does not involve epimerisation.

The erythro - 2 - dichloracetamido - 1-p-nitrophenyl-3-chloropropane-1-ols used as starting materials may be prepared from α-dichloracetamido-β-hydroxy-p-nitropropiophenone (U. S. Patent 2,515,239) by reaction with thionyl chloride to produce α-dichloracetamido-β-chloro-p-nitropropiophenone and reducing the α-dichloracetamido-β-chloro-p-nitropropiophenone as obtained with aluminum isopropylate. This method is described in detail in the application of Robert M. Jacob, Serial No. 212,482, filed February 23, 1951.

The erythro-2-dichloromethyl-4-p-nitrophenyl-hydroxymethyl-Δ²-oxazoline starting materials can be produced from the erythro-2-dichloracetamido-1-p-nitrophenyl-3-chloropropane-1-ol by the action of aqueous alkali. This method is described in detail in the application of Robert M. Jacob, Serial No. 212,481, filed February 23, 1951, now U. S. Patent 2,702,804.

The threo-2-dichloracetamido-1-p-nitrophenyl-3-chloro-propane-1-ol starting materials can be produced by reacting an erythro - 2 - dichloracetamido-1-p-nitrophenyl-3-chloropropane-1-ol with concentrated sulfuric acid at a temperature not above 45° C., diluting the mixture and neutralizing the reaction mixture in the cold. This method is described in detail in the application of Robert Jacob, Serial No. 212,482, filed February 23, 1951.

The threo - 2 - dichloromethyl-4-p-nitrophenylhydroxymethyl-Δ²-oxazoline starting materials can be obtained by reacting threo - 2 - dichloracetamido - 1-p-nitrophenyl-3-chloropropane-1-ol with aqueous alkali. This method is described in detail in the application of Robert M. Jacob, Serial No. 212,481, filed February 23, 1951.

The compounds of the present invention are useful intermediates for the production of antibiotics and for the production of other chemical compounds having therapeutic properties as well as other intermediates useful in the production of substances having therapeutic properties. For example, a 2-dichloracetamido-1-p-nitrophenyl-1,3-dichloropropane of the present invention can be cyclicized with dilute alkali to obtain the corresponding 2-dichloromethyl-5-p-nitrophenyl-Δ²-oxazoline as described and claimed in copending application 221,335 filed April 16, 1951.

Said oxazoline can be treated with dilute hydrochloric acid followed by neutralization to produce a 2-dichloracetamido-1-p-nitrophenyl-3-chloropropane-1-ol as described in copending application 212,482 filed February 23, 1951. Said compound can be cyclicized with dilute sodium hydroxide at room temperature to obtain a 2-dichloromethyl-4-p-nitrophenylhydroxymethyl-Δ²-oxazoline as described in copending application Serial No. 212,481 filed February 23, 1951.

The said oxazoline can be dissolved in dilute hydrochloric acid at a temperature of 50° C. or below followed by neutralization with aqueous ammonia in the cold to obtain a 2-dichloracetamido-1-p-nitrophenylpropane-1,3-diol as described in the application of Ronald Slack, Serial No. 199,937, filed December 8, 1950, now abandoned, the D-(—) isomer being known as chloramphenicol.

The present invention is illustrated by the following examples. In these examples, M. P. (cap.) indicates melting points determined by the capillary tube method and M. P. (Maq.) the instantaneous melting point as determined on the Maquenne block.

*Example I*

2 g. of DL-erythro 2-dichloromethyl-4-p-nitrophenylhydroxymethyl-$\Delta^2$-oxazoline, M. P. (cap.)=167° C., are heated under reflux for 1 hour and a half with 2.4 c.c. of pure thionyl chloride. On leaving the reaction mixture to cool, a crystalline precipitate is formed, which is filtered off and washed with anhydrous ether. On drying in vacuo in the presence of potash pellets, there is obtained 1.4 g. of DL-threo 2-dichloracetamido-1-p-nitrophenyl-1:3-dichloropropane of M. P. (cap.)=136–137° C.

*Example II*

A solution of 6.6 g. of L-threo 2-dichloromethyl-4-p-nitrophenylhydroxymethyl-$\Delta^2$-oxazoline of M. P. (Maq.)=142–143° C; $[\alpha]_D^{20}$=+176°55′ (c=5% in ethyl acetate) in 66 c.c. of dioxane containing 13% by weight of dry hydrochloric acid is heated on the water bath in a sealed tube for 1 hour at 100° C. The mixture is taken to dryness by distillation in vacuo in the cold; the white crystalline residue is washed with 200 c. c. of water, filtered off and recrystallised from 30 c. c. of methyl alcohol. After filtering, the product is washed with 2 x 3 c. c. of methyl alcohol and dried in vacuo. There is thus obtained 4.5 g. of L-threo 2-dichloracetamido-1-p-nitrophenyl-1:3-dichloropropane, M. P. (Maq.)=152–152.5° C. $[\alpha]_D^{22}$=+9°20′±20′ (c=6% in ethyl acetate).

*Example III*

Proceeding as in Example II but starting with 4 g. of D-threo 2-dichloromethyl-4-p-nitrophenylhydroxymethyl-$\Delta^2$-oxazoline of M. P. (Maq.)=143–144° C. $[\alpha]_D^{20}$=−176°50′ (c=5% in ethyl acetate) and 40 c. c. of dioxane containing 13% by weight of dry hydrochloric acid there is obtained after recrystallisation from methyl alcohol 1.95 g. of D-threo 2-dichloracetamido-1-p-nitrophenyl-1:3-dichloropropane, M. P. (Maq.)=151.5–152° C. $[\alpha]_D^{22}$=−9°18′±16′ (c=6% in ethyl acetate).

*Example IV*

Proceeding as in Example I starting from 0.34 g. of L-erythro 2-dichloromethyl-4-p-nitrophenylhydroxymethyl-$\Delta^2$-oxazoline of M. P. (cap.)=142–143° C; $[\alpha]_D^{25}$=−37° (c=4% in acetone) and 0.6 c. c. of pure thionyl chloride there is obtained 0.18 g. of D-threo 2-dichloracetamido-1-p-nitrophenyl-1:3-dichloropropane identical with the product of Example III.

*Example V*

3 g. of DL-erythro 2-dichloracetamido-1-p-nitrophenyl-3-chloropropane 1-ol of M. P. (cap.)=134° C. are heated under reflux on the water bath with 12 c. c. of thionyl chloride. The mixture is poured onto crushed ice. After stirring for some time, a granular precipitate is formed which is filtered off, washed with water and dried in vacuo in the presence of potash pellets. There is thus obtained 2.3 g. of a product which, after recrystallisation from ethyl acetate and then from alcohol, melts at 135–136° C. (cap.) and which is identical to that of Example I.

*Example VI*

Proceeding as in Example I but starting from 0.5 g. of L-erythro 2-dichloracetamido - 1 - p-nitrophenyl-3-chloropropane 1-ol, of M. P. (cap.)=114–116° C; $[\alpha]_D^{25}$=−12°36′ (c=4% in methanol) and 0.6 c. c. of thionyl chloride there is obtained 0.26 g. of D-threo 2-dichloracetamido-1-p-nitrophenyl-1:3-dichloropropane identical with the product of Example III.

*Example VII*

10 g. of DL-threo 2-dichloracetamido-1-p-nitrophenylpropane 1:3-diol are heated with 80 c. c. of dioxane containing 13% by weight of hydrochloric acid for 3 hours on the boiling water bath. After leaving the reaction mixture to cool, a hydrochloride crystallises which is filtered off. The filtrate is treated with 200 c. c. of water and a product crystallises which is filtered off, washed in water and dried. There is obtained 5 g. of DL-threo 2-dichloracetamido-1-p-nitrophenyl-1:3-dichloropropane which after recrystallisation in 80% aqueous methyl alcohol is identical with the product obtained in Example I.

*Example VIII*

15 g. of L-threo 2-dichloroacetamido-1-p-nitrophenylpropane 1:3-diol of M. P. (cap.)=151° C.

$$[\alpha]_D^{20} = -20°42'$$

(c=2.5% in ethanol) is treated as in Example VII with 120 cc. of dioxane containing 13% by weight of hydrochloric acid and 5.74 g. of a product is obtained which, after recrystallisation in 80% aqueous methanol, is identical with that of Example II.

*Example IX*

10 g. of DL-threo 2-dichloroacetamido-1-p-nitrophenyl-3-chloropropane 1-ol of M. P. (cap.)=137° C. are heated for 5 hours in a boiling water bath with 50 cc. of dioxane containing 13% by weight of hydrochloric acid. After being left to cool, the mixture is diluted with water until the turbidity vanishes. A product crystallises which is filtered off, washed with water and recrystallised from 100 cc. of 80% aqueous methanol. There is thus obtained 5.3 g. of a compound which melts at 136–137° C. (cap.) and which is identical with that of Example I.

We claim:
1. The threo forms of 2-dichloracetamido-1-p-nitrophenyl-1:3-dichloropropane.
2. DL-threo 2-dichloroacetamido-1-p-nitrophenyl-1:3-dichloropropane.
3. D-threo 2 - dichloracetamido-1-p-nitrophenyl-1:3-dichloropropane.
4. L-threo-2-dichloracetamido-1-p-nitrophenyl-1,3 - dichloropropane.
5. A process for the preparation of a threo form of 2-dichloroacetamido-1-p-nitrophenyl-1,3-dichloropropane which comprises heating at a temperature not less than the refluxing temperature of thionyl chloride a 2-dichloromethyl-4-p-nitrophenylhydroxymethyl-$\Delta^2$-oxazoline with a chloride compound of the class consisting of thionyl chloride and hydrogen chloride under anhydrous conditions.
6. A process for the preparation of a threo form of 2-dichloracetamido-1-p-nitrophenyl - 1,3- dichloropropane which comprises heating an erythro form of 2-dichloromethyl-4-p-nitrophenylhydroxymethyl-$\Delta^2$-oxazoline with thionyl chloride at refluxing temperature under anhydrous conditions.
7. A process according to claim 6 wherein the oxazoline heated is in the DL erythro form and the resulting compound is in the DL threo form.
8. A process according to claim 6 wherein the oxazoline heated is in the D erythro form and the resulting compound is in the D threo form.
9. A process for the preparation of a threo form of 2-dichloracetamido-1-p-nitrophenyl -1,3- dichloropropane which comprises heating a threo form of 2-dichloro- methyl-4-p-nitrophenylhydroxymethyl-Δ²-oxazoline with hydrogen chloride under anhydrous conditions at about 100° C.

10. A process according to claim 9 wherein the oxazoline heated is in the D-threo form and the resulting dichloro compound is also in the D-threo form.

11. A process according to claim 9 wherein the oxazoline heated is in the L-threo form and the resulting dichloro compound is also in the L-threo form.

References Cited in the file of this patent

UNITED STATES PATENTS

| | | |
|---|---|---|
| 2,114,326 | Adams et al | Apr. 19, 1938 |
| 2,513,346 | Moersch et al. | July 4, 1950 |